(12) United States Patent
Dorfmann

(10) Patent No.: US 8,996,202 B1
(45) Date of Patent: Mar. 31, 2015

(54) PRESENTING NOTICES TO AIRMEN IN CHARTING APPLICATIONS

(75) Inventor: Cindy Dorfmann, Darmstadt (DE)

(73) Assignee: The Boeing Company, Chicago, IL (US)

( * ) Notice: Subject to any disclaimer, the term of this patent is extended or adjusted under 35 U.S.C. 154(b) by 733 days.

(21) Appl. No.: 12/689,600

(22) Filed: Jan. 19, 2010

(51) Int. Cl.
*G06F 7/00* (2006.01)
*G01C 23/00* (2006.01)

(52) U.S. Cl.
CPC .................................. *G01C 23/005* (2013.01)
USPC .......................................................... 701/3

(58) Field of Classification Search
CPC .............. B64D 45/00; B64D 45/0005; B64D 45/0015; B64D 45/02; B64D 45/04; B64D 45/06; B64D 45/08; B64D 47/00; B64D 47/02; G01C 23/00; G01C 23/005; G08G 5/0004; G08G 5/0013; G08G 5/0017; G08G 5/0021; G08G 5/0026; G08G 5/0047; G08G 5/0052; G08G 5/0056; G08G 5/006; G08G 5/0065; G08G 5/0069; G08G 5/0095; G08G 5/02; G08G 5/025; Y10S 707/99941; Y10S 707/99942; Y10S 707/99943

USPC .......................................................... 701/3, 4
See application file for complete search history.

(56) References Cited

U.S. PATENT DOCUMENTS 6,199,008 B1 * 3/2001 Aratow et al. ................. 701/120
2006/0129286 A1 * 6/2006 King ................................... 701/4

OTHER PUBLICATIONS

Hatta, "Current activity towards digital AIM in Japan", 5th Digital NOTAM Workshop, Eurocontrol, Sep. 2009, pp. 1-10.
"NOTAM Retrieval", Defense Internet NOTAM Service, pp. 1-2 retrieved Jan. 14, 2010 https://www.notams.jcs.mil/dinsQueryWeb/.
Vernaleken et al., "Considerations on Symbology, Data Requirements, and Operational Concept for Integral NOTAM Visualization on Airport Moving Map Displays," Proceedings of SPIE vol. 6957, Enhanced and Synthetic Vision 2008, Apr. 2008, 16 pages.

* cited by examiner

*Primary Examiner* — Jerrah Edwards
(74) *Attorney, Agent, or Firm* — Yee & Associates, P.C.

(57) ABSTRACT

A method and apparatus for presenting notices used to operate an aircraft. A notice containing information in a text format is received. A category for the notice is identified in response to receiving the notice containing the information. An icon for the notice associated with the category identified for the notice is identified. The icon is displayed for the notice in a location on a map presented on a display device. The location is selected using the information.

20 Claims, 11 Drawing Sheets

PRESENTING NOTICES TO AIRMEN IN CHARTING APPLICATIONS

BACKGROUND INFORMATION

1. Field:

The present disclosure relates generally to aircraft and, in particular, to presenting information for use in operating aircraft. Still more particularly, the present disclosure relates to a method and apparatus for presenting notices to airmen on maps for use in operating aircraft.

2. Background:

Notices to airmen contain information used to operate an aircraft. Notices to airmen are also referred to as NOTAMs. A notice to airmen is created and transmitted by government agencies. The notice to airmen may include information identifying hazards en route or at a specific location. These notices are filed with an aviation authority. In turn, the aviation authority disseminates or sends the notices to the various operators of aircraft.

Notices to airmen include information used to operate an aircraft. For example, the information may be about events. These events may change the flight of an aircraft. These types of events include, for example, air shows, parachute jumps, rocket launches, and other types of events. Further, these notices may include information about flights for important people, such as heads of state. Notices to airmen also may identify closed runways, inoperable radio navigation aids, military exercises, inoperable lights on tall obstructions, a passage of birds through airspace, the status of runways, taxiways, and aprons with respect to snow, ice, and standing water, and/or other suitable information.

Notices to airmen are distributed in a text format. A notice to airmen may include several pages of text. This text is often complex and displayed in different formats, depending on the entity distributing the notice to airmen. Further, the notice to airmen is also in an encoded format. For example, a notice to airmen may include abbreviations, selected formatting, and selected labeling. Currently, these notices to airmen may be presented in paper form or on a display screen by a computer, such as an electronic flight bag.

The presentation of these notices in text and in encoded formats increases the amount of time needed to identify information for operating an aircraft. As a result, increased workloads on operators, such as pilots, may occur. This increased workload may increase the amount of time needed to complete a flight.

Therefore, it would be advantageous to have a method and apparatus that takes into account one or more of the issues discussed above, as well as possibly other issues.

SUMMARY

In one advantageous embodiment, a method is present for presenting notices used to operate an aircraft. A notice containing information in a text format is received. A category for the notice is identified in response to receiving the notice containing the information. An icon for the notice associated with the category identified for the notice is identified. The icon for the notice is displayed in a location on a map presented on a display device. The location is selected using the information.

In another advantageous embodiment, an apparatus comprises a storage device, program code stored on the storage device, and a processor unit configured to run the program code. The program code is run to receive a notice comprising information in a text format. The program code is run to identify a category for the notice in response to receiving the notice containing the information. The program code is run to identify an icon associated with the category identified for the notice. The program code is run to display the icon in a location on a map presented on a display device. The location is selected using the information.

In yet another advantageous embodiment, a computer program product for presenting notices used to operate an aircraft comprises a computer recordable storage medium and program code stored on the computer recordable storage medium. Program code is present for receiving a notice comprising information in a text format. Program code is present for identifying a category for the notice in response to receiving the notice containing the information. Program code is present for identifying an icon associated with the category identified for the notice. Program code is present for displaying the icon in a location on a map presented on a display device. The location is selected using the information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
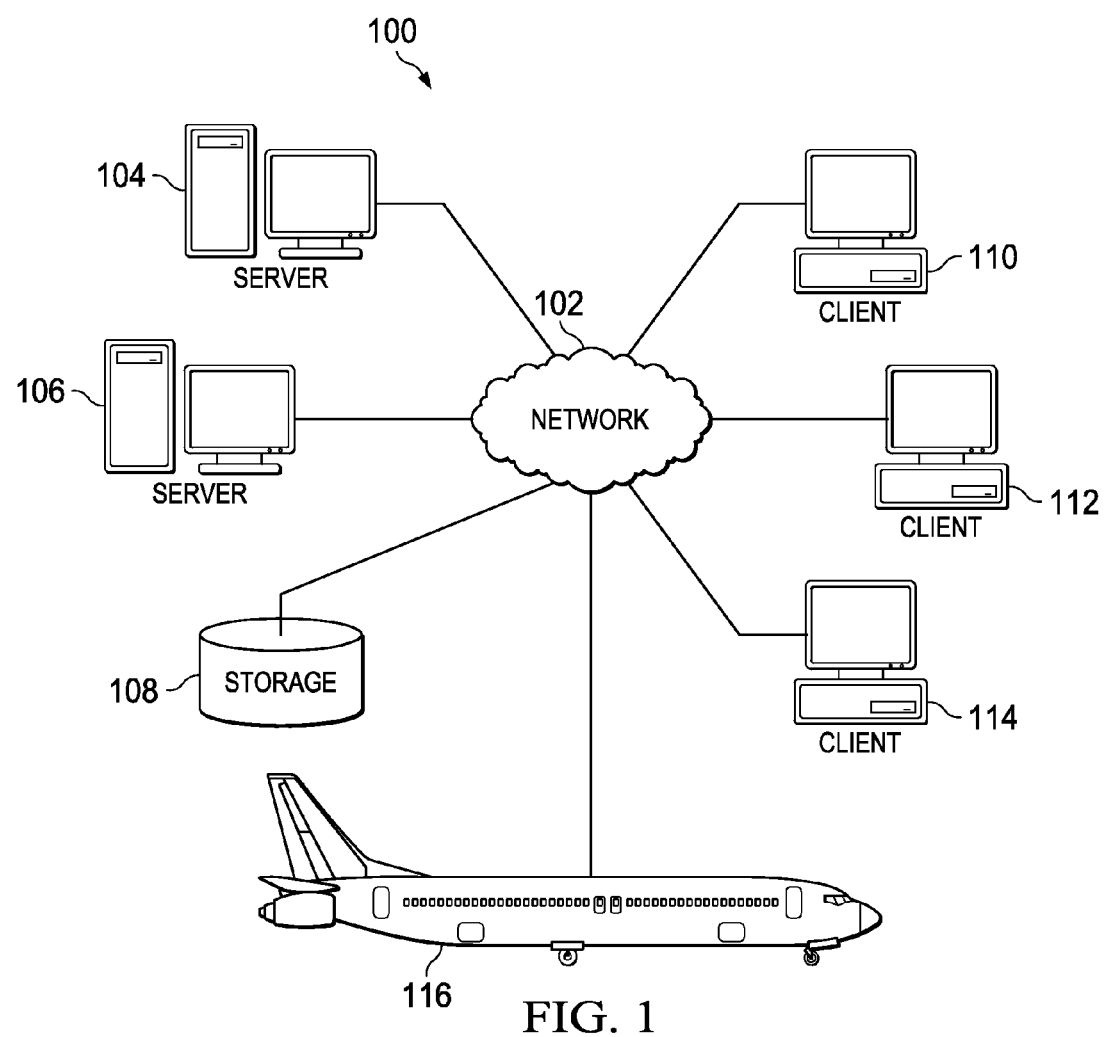
FIG. 1 is an illustration of a network of data processing systems in accordance with an advantageous embodiment.
Figure 2:
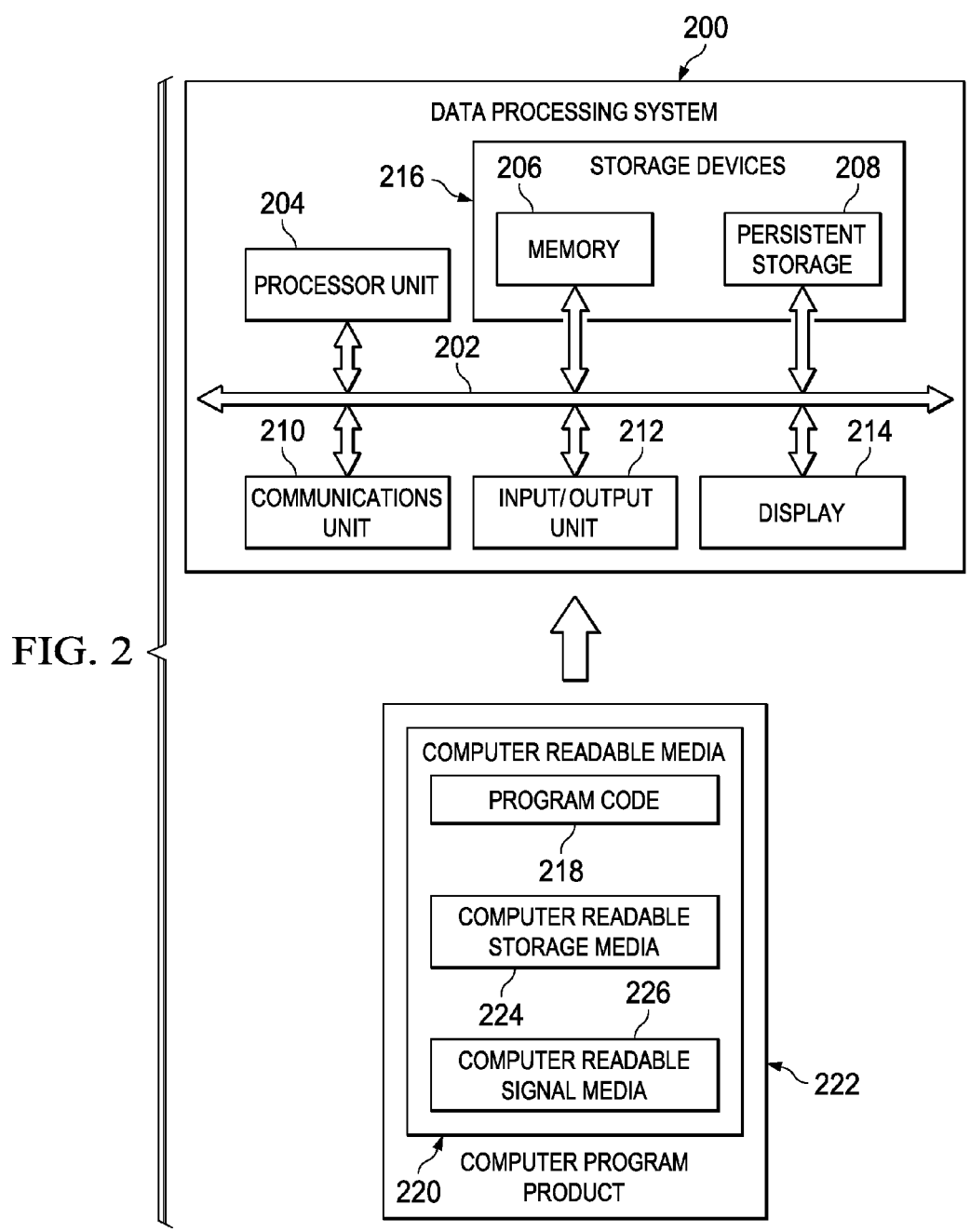
FIG. 2 is an illustration of a block diagram of a data processing system in accordance with an advantageous embodiment.

With reference now to the figures and, in particular, with reference to FIGS. 1-2, exemplary illustrations of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to FIG. 1, an illustration of a network of data processing systems is depicted in accordance with an advantageous embodiment. Network data processing system 100 is a network of computers in which embodiments may be implemented. Network data processing system 100 contains network 102, which is the medium used to provide communications links between various devices and computers connected together within network data processing system 100.

Network 102 may include connections, such as wire, wireless communication links, or fiber optic cables. In the depicted example, server computer 104 and server computer 106 connect to network 102 along with storage unit 108. In addition, client computers 110, 112, and 114 connect to network 102. These client computers 110, 112, and 114 may be, for example, personal computers or network computers. In the depicted example, server computer 104 provides data, such as boot files, operating system images, and applications to client computers 110, 112, and 114.

Client computers 110, 112, and 114 are client computers to server computer 104 in this example. Aircraft 116 also is a client and includes a client computer that may exchange information with client computers 110, 112, and 114. Aircraft 116 also may exchange information with server computers 104 and 106. Aircraft 116 may exchange data with different computers through a wireless communications link while in-flight or any other type of communications link while on the ground. In these illustrative examples, this information may include information used to operate aircraft 116. The information may be, for example, notices to airmen, which are also referred to as NOTAMs.

Network data processing system 100 may include additional server computers, client computers, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as, for example, an intranet, a local area network (LAN), or a wide area network (WAN). FIG. 1 is intended as an example and not as an architectural limitation for different embodiments.

Turning now to FIG. 2, an illustration of a block diagram of a data processing system is depicted in accordance with an advantageous embodiment. Data processing system 200 is an example of a data processing system that may be used to implement server computers and client computers, such as server computer 104 and client computer 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different considerations. For example, the different advantageous embodiments recognize and take into account that the current format in which information is sent to operators of aircraft may require more time than desired to read and analyze for use in operating the aircraft. The different advantageous embodiments also recognize and take into account that notices to airmen may be presented in electronic form. These notices to airmen may be presented on a display device on an electronic flight bag. This type of presentation of information may allow for easier reading of a notice to airmen. For example, the different advantageous embodiments recognize and take into account that an operator may search for key words in a particular notice to airmen that is in electronic form.

The different advantageous embodiments recognize and take into account, however, that even with this type of presentation of notices to airmen, the different formats, abbreviations, labeling, and/or other currently used presentation mechanisms may still require more time than desired for a pilot or other operator of an aircraft to identify notices to airmen that may be relevant to a particular flight.

The different advantageous embodiments recognize and take into account that one solution may involve overlaying red or yellow crosses or x's on a map or marking construction sites with a red box. This type of marking may be presented on a moving map or other type of map application.

The different advantageous embodiments recognize and take into account that this type of solution may only display a limited number of notices to airmen. Other notices are still displayed in a text only format. As a result, the different advantageous embodiments recognize and take into account that special or selected notices to airmen may be seen, while other notices may not be seen by looking at a map presented on a display device.

Thus, the different advantageous embodiments provide a method and apparatus for presenting notices used to operate an aircraft. A notice comprising information in a text format is received. In response to receiving a notice containing information, a category for the notice is identified. An icon associated with the category identified from the notice also is identified. The icon is displayed in a location on the map presented on a display device. The location for displaying the icon on the map is selected using the information in the notice.

Figure 3:
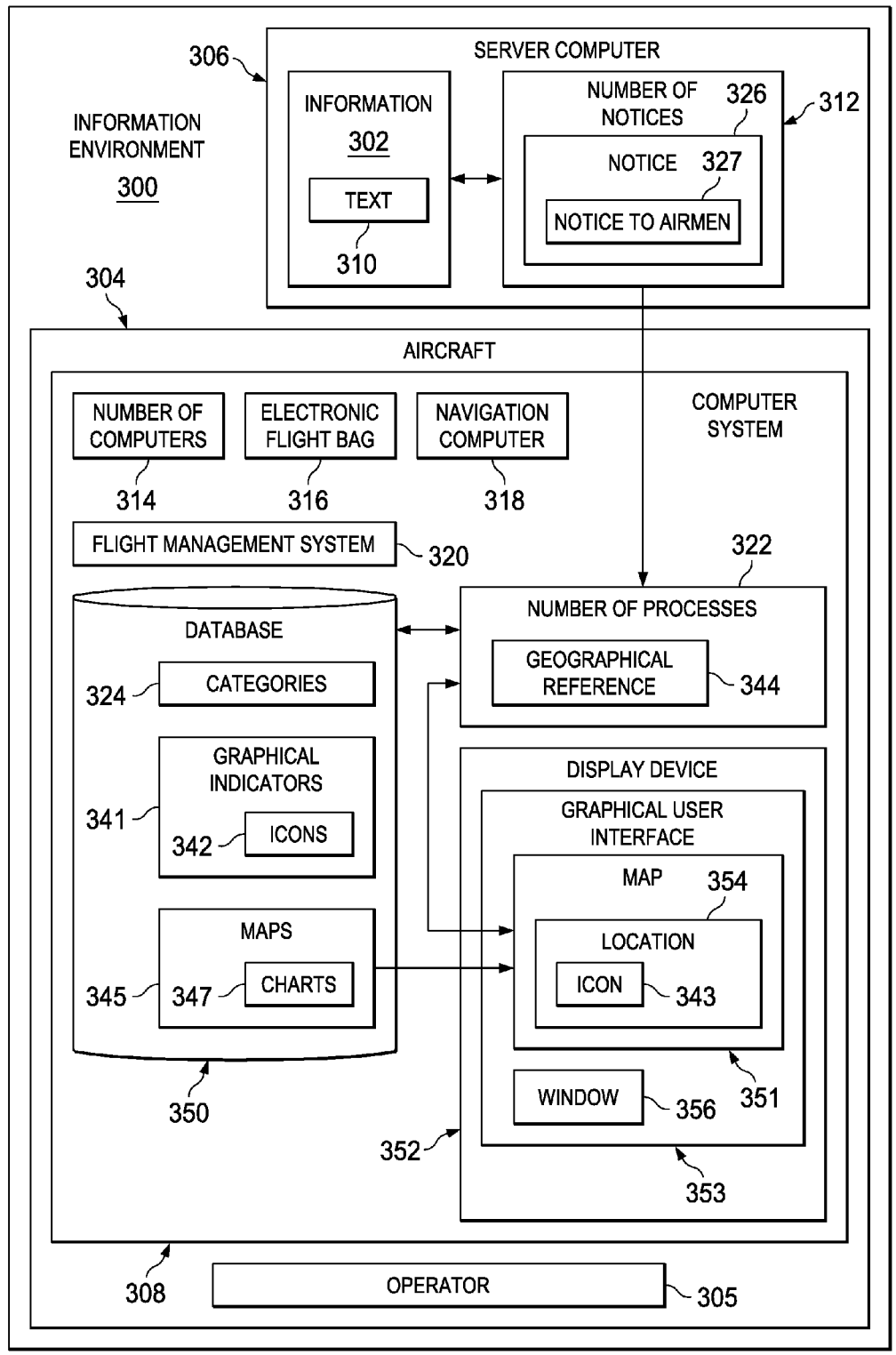
FIG. 3 is an illustration of a block diagram of an information environment in accordance with an advantageous embodiment.

With reference now to FIG. 3, an illustration of a block diagram of an information environment is depicted in accordance with an advantageous embodiment. In this illustrative example, information environment 300 is used to present information 302 to aircraft 304 to operate aircraft 304. Network data processing system 100 in FIG. 1 is an example of a system that may be used to implement information environment 300 in FIG. 3. Aircraft 304 may be an example of one implementation of aircraft 116 in FIG. 1.

Information 302 is used by operator 305 to operate aircraft 304. For example, information 302 may be about events. These events may be events that change the flight of aircraft 304. These events include, for example, without limitation, parachute jumps, air shows, kite-flying events, rocket launches, and other types of events. Further, information 302 identifies other flights for important people, such as heads of state. These types of flights may lead to temporary flight restrictions for aircraft 304.

Still further, information 302 also identifies closed runways, inoperable radio navigational aids, military exercises, inoperable lights on tall obstructions, a passage of birds through airspace, changes in the concentration of volcanic ash or dust in an airspace, the status of runways, taxiways, and aprons with respect to snow, ice, and standing water, and/or other suitable types of information. In some advantageous embodiments, information 302 includes communication radio frequency changes, airport hours, airport procedures, and/or other suitable information.

In these illustrative examples, information 302 takes the form of text 310 in these illustrative examples. In other words, information 302 does not use graphics, video, and/or audio.

Information 302 is stored on server computer 306. Server computer 306 is an example of one implementation for server computer 104 or server computer 106 in FIG. 1. Server computer 306 may be implemented using data processing system 200 in FIG. 2. In these illustrative examples, server computer 306 is used by an entity, such as, for example, a government agency, a third party service, or some other type of entity.

Server computer 306 sends information 302 to computer system 308 in the form of number of notices 312. Each of number of notices 312 contains text 310. Notice 326 is an example of a notice within number of notices 312. In these examples, notice 326 is notice to airmen (NOTAM) 327.

In these depicted examples, computer system 308 is located in aircraft 304. Computer system 308 includes number of computers 314. In these illustrative examples, number of computers 314 is implemented using data processing system 200 in FIG. 2. As depicted, computer system 308 comprises at least one of electronic flight bag (EFB) 316, navigation computer 318, flight management system 320, and/or some other suitable type of system.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and 10 of item C; four of item B and seven of item C; and/or other suitable combinations.

In these illustrative examples, number of processes 322 runs on computer system 308. Number of processes 322 receives number of notices 312 from server computer 306. Number of processes 322 identifies categories 324 and graphical indicators 341 for number of notices 312 using database 350. In these illustrative examples, database 350 stores categories 324, graphical indicators 341, and maps 345. Database 350 is located in computer system 308 in these illustrative examples.

As one example, when notice 326 is received by number of processes 322, number of processes 322 identifies a category within categories 324 in database 350 for notice 326. This category is identified using information 302 in notice 326. Based on the category identified for notice 326, number of processes 322 identifies a graphical indicator in graphical indicators 341 associated with the category identified for notice 326. In these illustrative examples, graphical indicators 341 take the form of icons 342.

In these illustrative examples, number of processes 322 identifies a number of maps within maps 345 for each graphical indicator in graphical indicators 341 identified for notice 326. The number of maps may be identified using information 302 in notice 326. This information may take the form of geographical reference 344, an identification of an object, or some other suitable type of information. Additionally, information 302 in notice 326 may be used to identify a location to display the graphical indicator in the number of maps.

In these depicted examples, number of processes 322 identifies geographical reference 344 within information 302 in notice 326. Geographical reference 344 is used to identify at least one of a location and an area on maps 345. In these examples, a location is defined by a geographic coordinate system. This geographic coordinate system may be, for example, without limitation, a latitude and longitude coordinate system.

In these illustrative examples, after number of notices 312 has been associated with maps 345, maps 345 are ready to be displayed with graphical indicators 341 for number of notices 312. For example, number of processes 322 selects a number of maps within maps 345 stored in database 350 for display. The number of maps from maps 345 selected is for presentation to operator 305. In these depicted examples, maps 345 take the form of charts 347. A chart is a map that includes information used to assist in the operation of an aircraft. A chart for aeronautical use may include, for example, without limitation, radio frequencies, alternative landing areas, waypoints, and/or other suitable information that may be used to operate the aircraft.

In these depicted examples, number of processes 322 selects map 351 in maps 345 based on the location of aircraft 304. Map 351 is a moving map in these examples. Map 351 is displayed on display device 352 in these examples. More specifically, map 351 is displayed on graphical user interface 353 on display device 352 for presentation to operator 305. Display device 352 is in aircraft 304. Display device 352 may be, for example, a computer monitor, a touch screen, a head-mounted display device, or some other suitable type of display device.

Number of processes 322 also displays icon 343 on map 351 on display device 352. Icon 343 is associated with the category identified in categories 324 for notice 326. In these illustrative examples, icon 343 is displayed at location 354 on map 351. Location 354 is selected using geographical reference 344. In other words, location 354 on map 351 corresponds to geographical reference 344.

In this illustrative example, operator 305 of aircraft 304 selects icon 343 on map 351 displayed on display device 352 to view information 302 in the form of text 310. For example, selection of icon 343 displays window 356 on display device 352. In these illustrative examples, window 356 contains information 302 comprised in notice 326 in the form of text 310. Operator 305 uses information 302 contained in window 356 to operate aircraft 304.

The illustration of information environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, a portion of computer system 308 may be located in aircraft 304, while another portion of computer system 308 may be located on the ground. For example, the portion of computer system 308 located on the ground may be at an airport or some other type of ground station.

In other advantageous embodiments, database 350 may not be part of computer system 308. Database 350 may be part of a computer system on the ground or in some other suitable location. In yet other advantageous embodiments, other databases in addition to or in place of database 350 may be present. For example, categories 324 and graphical indicators 341 may be stored on database 350, while maps 345 may be stored on a different database.

In some advantageous embodiments, an operator on the ground may use information 302 in number of notices 312. For example, an operator on the ground may use information 302 to operate other aircraft in addition to or in place of aircraft 304.

Figure 4:
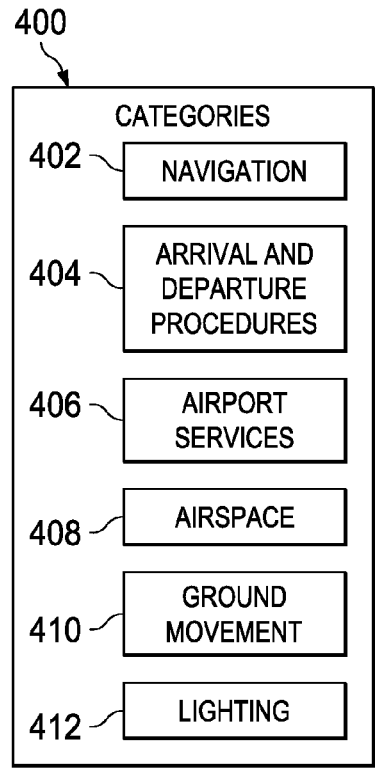
FIG. 4 is an illustration of a block diagram of categories for a notice in accordance with an advantageous embodiment.

With reference now to FIG. 4, an illustration of a block diagram of categories for a notice is depicted in accordance with an advantageous embodiment. In this illustrative example, categories 400 are an example of one implementation for categories 324 in FIG. 3. Categories 400 are categories for notices, such as number of notices 312 in FIG. 3. Categories 400 are stored in a database, such as database 350 in FIG. 3.

In these illustrative examples, the information contained in a notice, such as notice 326 in FIG. 3, is identified as belonging to one of categories 400. Categories 400 include navigation 402, arrival and departure procedures 404, airport services 406, airspace 408, ground movement 410, lighting 412, and/or some other suitable type of category.

Navigation 402 includes information about terminal navigation facilities, en-route navigation facilities, navigation warnings, communication and surveillance facilities, and/or other suitable types of navigational information. Arrival and departure procedures 404 include information about air traffic procedures, instrument and microwave landing systems, and/or other information pertaining to arrival and departure procedures. Airport services 406 include information about air traffic services, aeronautical information services, rescue services, meteorological information, and/or other suitable types of information.

Airspace 408 includes information about the organization of airspace, airspace restrictions, temporary flight restrictions, requirements for aircraft entry into particular portions of airspace, and other types of information. Ground movement 410 includes information about movement in a landing area, communications facilities, surveillance facilities, and/or other suitable information. Lighting 412 includes information about airport lighting facilities, the status of lights on obstructions, and other suitable information.

The illustration of categories 400 in FIG. 4 is only an example of one implementation for categories 400. In other advantageous embodiments, categories 400 may include different categories than the categories presented in FIG. 4. In yet other advantageous embodiments, a fewer or greater number of categories than depicted in FIG. 4 may be present within categories 400.

In some advantageous embodiments, categories 400 may include subcategories. For example, airspace 408 may include a subcategory for restrictions and a subcategory for airspace organization.

Figure 5:
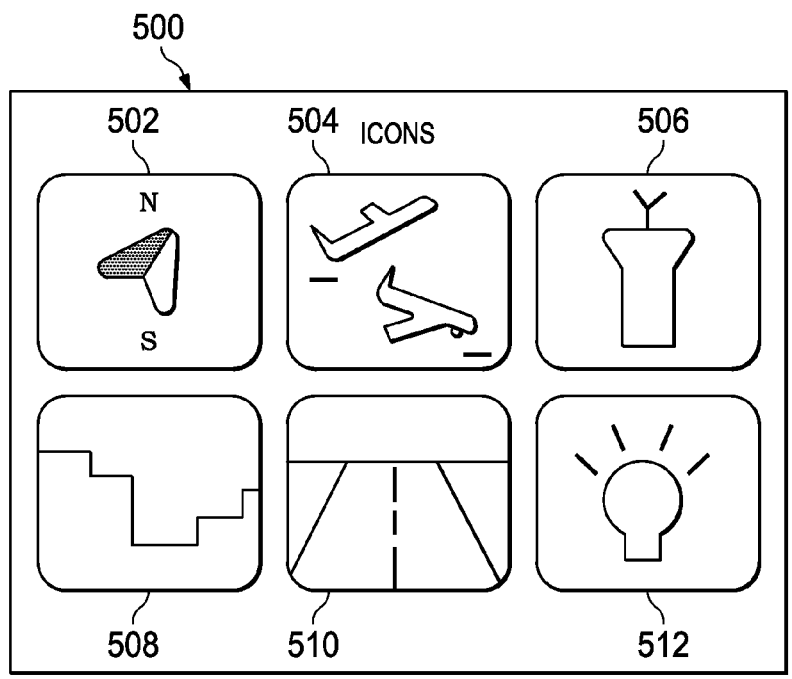
FIG. 5 is an illustration of icons used for notices in accordance with an advantageous embodiment.

With reference now to FIG. 5, an illustration of icons used for notices is depicted in accordance with an advantageous embodiment. In this illustrative example, icons 500 are an example of one implementation of icons 342 in FIG. 3. Further, icons 500 are an example of the type of icons that may be associated with categories 400 in FIG. 4.

As depicted, navigation icon 502 corresponds to navigation 402. Arrival and departure procedures icon 504 corresponds to arrival and departure procedures 404. Airport services icon 506 corresponds to airport services 406. Airspace icon 508 corresponds to airspace 408. Ground movement icon 510 corresponds to ground movement 410. Lighting icon 512 corresponds to lighting 412.

Figure 6:
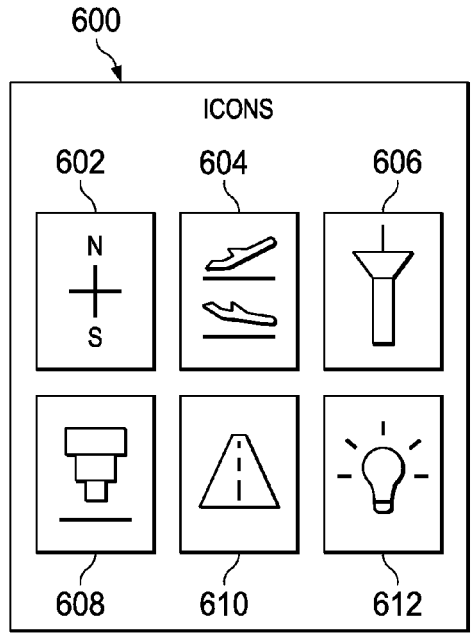
FIG. 6 is an illustration of icons in accordance with an advantageous embodiment.

With reference now to FIG. 6, an illustration of icons is depicted in accordance with an advantageous embodiment. In this illustrative example, icons 600 are another example of one implementation for icons 342 in FIG. 3. Further, icons 600 are another example of icons that may be associated with categories 400 in FIG. 4.

As depicted, navigation icon 602 corresponds to navigation 402. Arrival and departure procedures icon 604 corresponds to arrival and departure procedures 404. Airport services icon 606 corresponds to airport services 406. Airspace icon 608 corresponds to airspace 408. Ground movement icon 610 corresponds to ground movement 410. Lighting icon 612 corresponds to lighting 412.

The illustrations of icons 500 in FIG. 5 and icons 600 in FIG. 6 are examples of some implementations for icons for notices. In other advantageous embodiments, other types of icons may be used. The icons used are selected to give an operator an indication of the category associated with the icon and/or the type of information in the notice corresponding to the icon. In this manner, an operator of an aircraft may be able to discern which information is of interest based on the icons.

In some advantageous embodiments, icons may be associated with a category that has subcategories. These icons are displayed with different features, depending on the subcategory. For example, without limitation, an icon may be displayed with a different color for each of the different subcategories.

Figure 7:
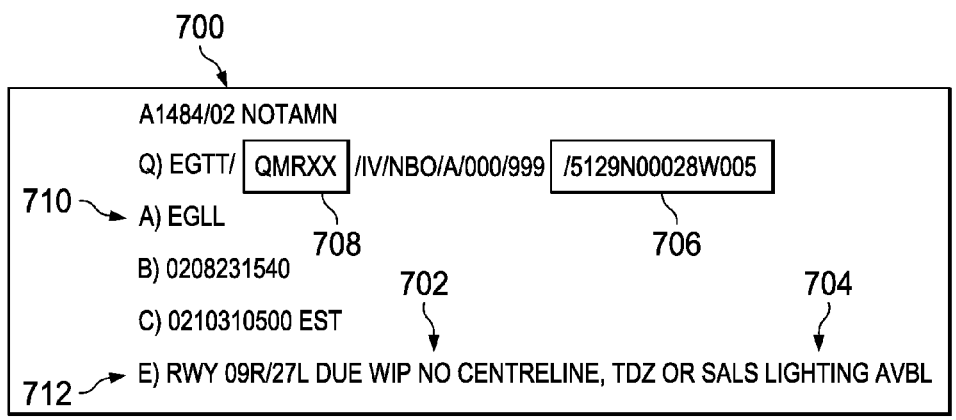
FIG. 7 is an illustration of a notice in accordance with an advantageous embodiment.

With reference now to FIG. 7, an illustration of a notice is depicted in accordance with an advantageous embodiment. In this illustrative example, notice 700 is an example of one implementation for notice 326 in FIG. 3. Notice 700 includes information 702 in the format of text 704.

In this illustrative example, an identification of a map for an icon to represent notice 700 may be identified within text 704 for information 702 in notice 700. For example, line 710 in notice 700 contains an identification of an airport. The identification of this airport may be used to identify a number of maps on which to display the icon for notice 700.

An identification of a location for an icon to represent notice 700 also may be identified within information 702 in notice 700. For example, line 712 contains information that may be used to identify an object on a map. Line 712 identifies a runway for the airport identified in line 710. The identification of this runway may be used to identify a location on a map at which to display the icon for notice 700.

As depicted in this example, information 702 also contains geographic reference 706 and category code 708. Geographic reference 706 also may be used to identify a map and/or a location on a map for displaying the icon for notice 700. Geographic reference 706 defines this location using a latitude and longitude coordinate system in this illustrative example.

Category code 708 is used to identify the category for notice 700. Category code 708 corresponds to a category, such as a category in categories 400 in FIG. 4. In these examples, a list of category codes and corresponding categories are stored on a database, such as database 350 in FIG. 3. Category code 708 is compared to this list to identify the category for notice 700. The identification of a category for notice 700 is used to identify an icon to represent notice 700.

The illustration of notice 700 in FIG. 7 is an example of one implementation for a notice. Other types of notices may include additional information other than the information presented in FIG. 7. For example, in some advantageous embodiments, notice 700 may include a timestamp, a date, and/or other suitable information.

Figure 8:
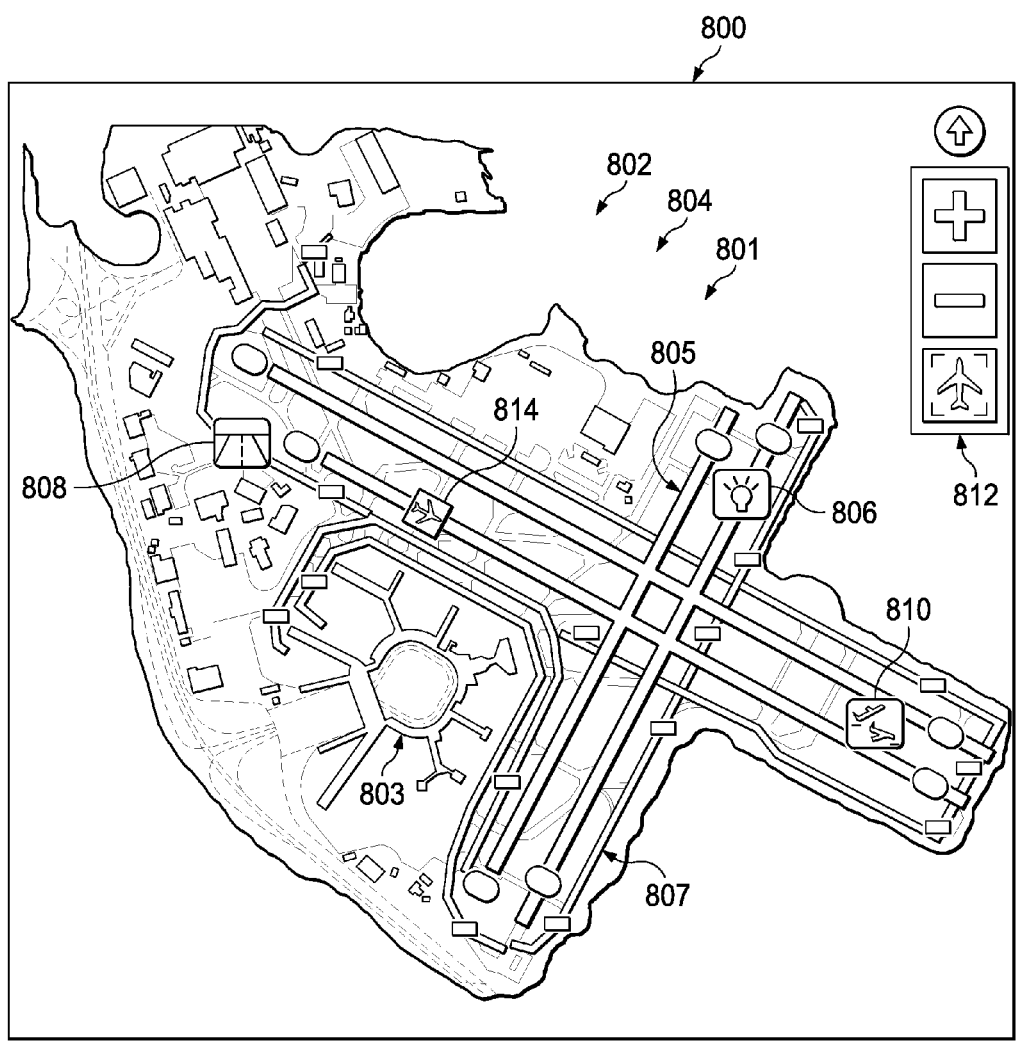
FIG. 8 is an illustration of a graphical user interface in accordance with an advantageous embodiment.

With reference now to FIG. 8, an illustration of a graphical user interface is depicted in accordance with an advantageous embodiment. In this illustrative example, graphical user interface 800 is an example of one implementation for graphical user interface 353 in FIG. 3. Graphical user interface 800 is for a display device on an aircraft.

As depicted, graphical user interface 800 displays map 802. Map 802 takes the form of chart 804 in this depicted example. Map 802 is for airport 801. Map 802 includes terminal areas 803, runways 805, and taxiways 807 for airport 801.

Lighting icon 806, ground movement icon 808, and arrival and departure procedures icon 810 are displayed on map 802. Each of these icons is for a notice, such as notice 326 in FIG. 3.

In this illustrative example, aircraft button 812 is also displayed on map 802. An operator may use aircraft button 812 to display aircraft icon 814 on map 802 and/or remove aircraft icon 814 from map 802. Aircraft icon 814 indicates a position of the aircraft. This position is based on at least one of a location of the aircraft and a direction in which the aircraft is facing.

Figure 9:
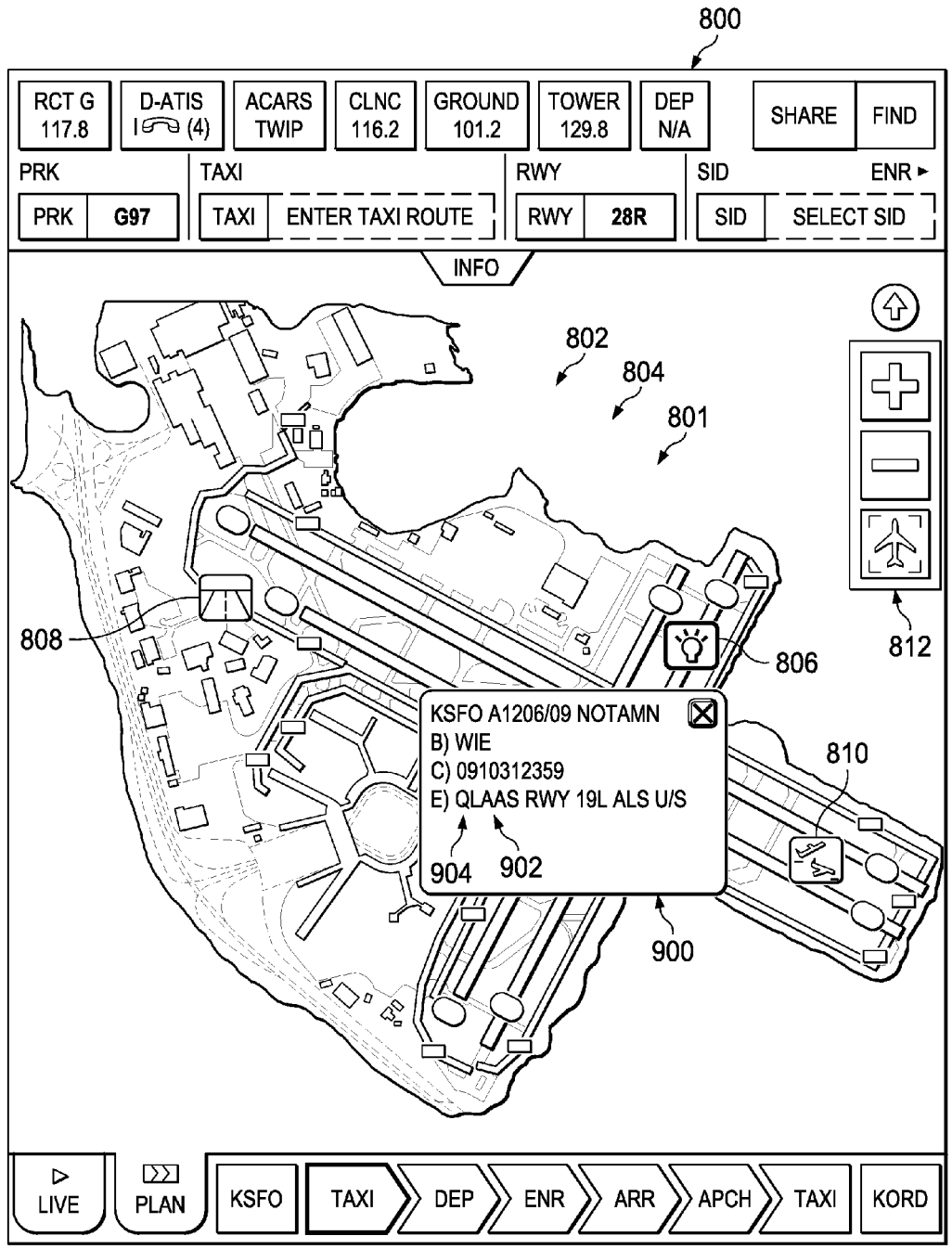
FIG. 9 is an illustration of a graphical user interface in accordance with an advantageous embodiment.

With reference now to FIG. 9, an illustration of a graphical user interface is depicted in accordance with an advantageous embodiment. In this illustrative example, user input has been received selecting lighting icon 806 on map 802 through graphical user interface 800. This selection of lighting icon 806 causes the display of window 900 on map 802. Window 900 may be a popup window. As depicted, window 900 contains notice 902 associated with lighting icon 806. Notice 902 contains information 904 in the form of text in this illustrative example.

Figure 10:
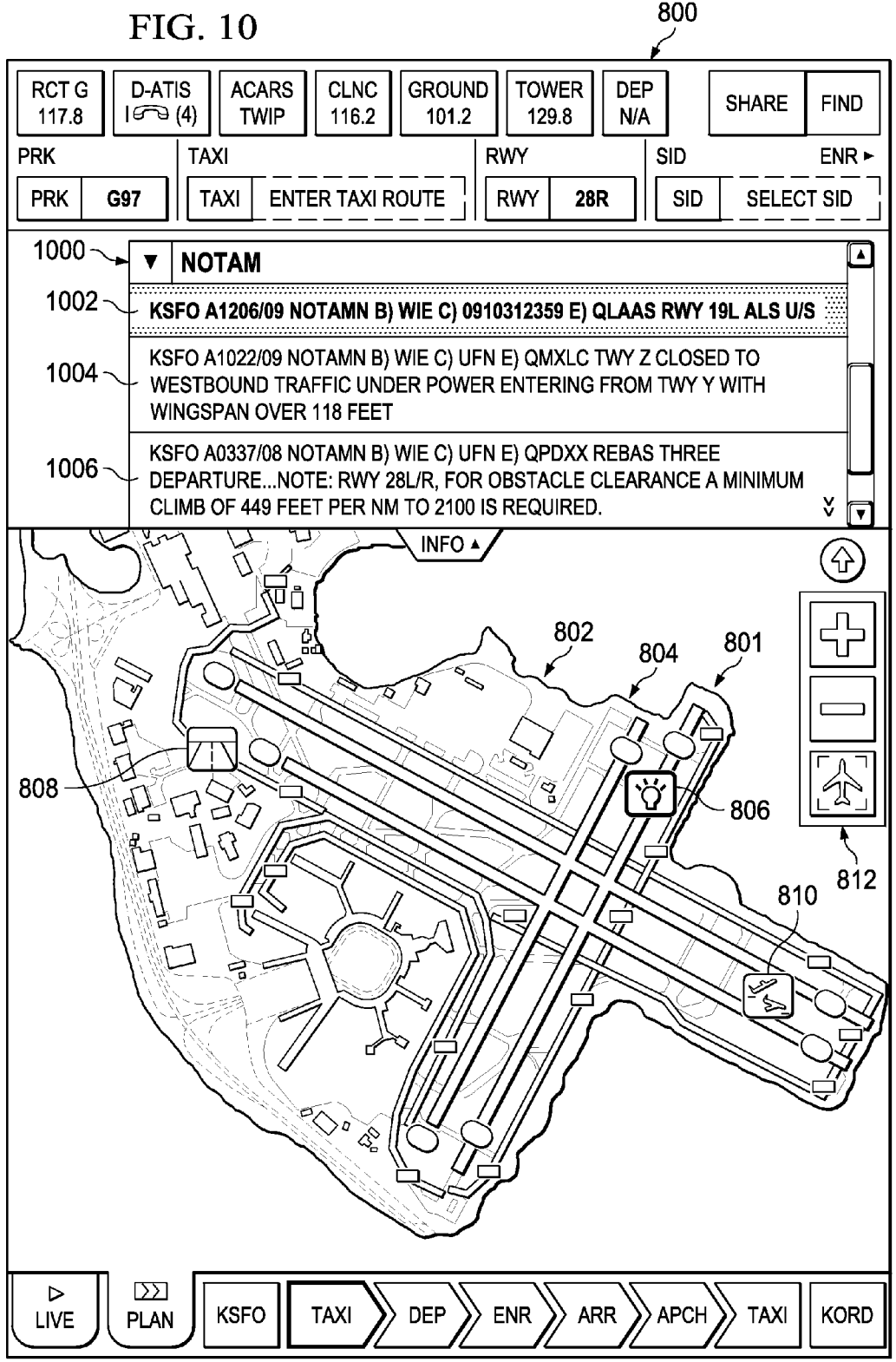
FIG. 10 is an illustration of a graphical user interface in accordance with an advantageous embodiment.

With reference now to FIG. 10, an illustration of a graphical user interface is depicted in accordance with an advantageous embodiment. In this illustrative example, graphical user interface 800 includes section 1000 in addition to map 802.

Section 1000 includes notice 1002, notice 1004, and notice 1006. These notices contain information to operate the aircraft in the form of text. Notice 1002 corresponds to lighting icon 806. Notice 1004 corresponds to ground movement icon 808. Notice 1006 corresponds to arrival and departure procedure icon 810.

In this illustrative example, the selection of lighting icon 806 causes notice 1002 to be highlighted in section 1000. The selection of ground movement icon 808 causes notice 1004 to be highlighted in section 1000. The selection of arrival and departure procedures icon 810 causes notice 1006 to be highlighted in section 1000. A notice is highlighted by a change in brightness, a change in color, and/or some other suitable type of change.

In some advantageous embodiments, section 1000 may not be displayed in graphical user interface 800 until an icon on map 802 has been selected.

Figure 11:
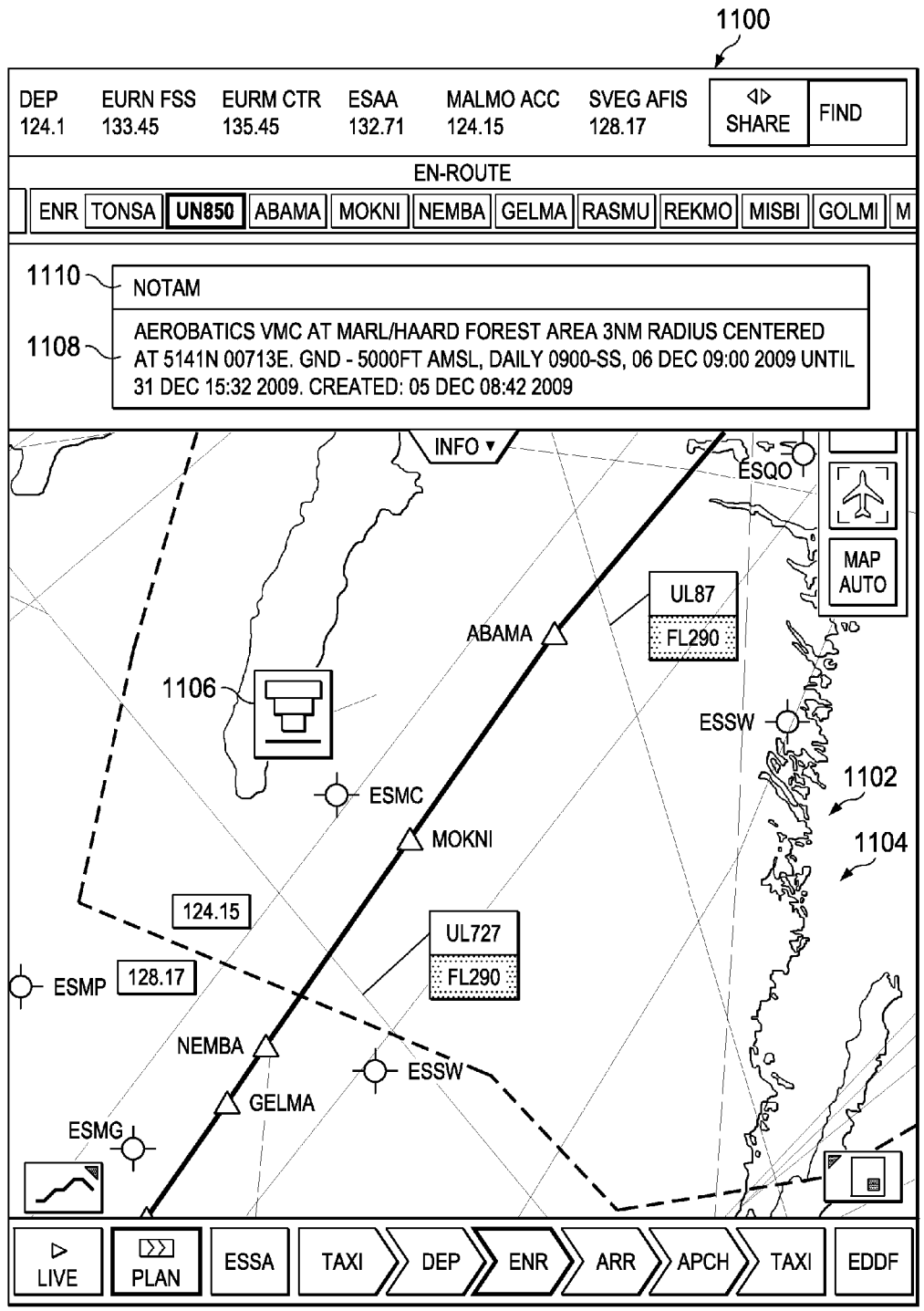
FIG. 11 is an illustration of a graphical user interface in accordance with an advantageous embodiment.

With reference now to FIG. 11, an illustration of a graphical user interface is depicted in accordance with an advantageous embodiment. In this illustrative example, graphical user interface 1100 is another example of one implementation for graphical user interface 353 in FIG. 3.

Graphical user interface 1100 displays map 1102. Map 1102 takes the form of chart 1104 in this depicted example. Airspace icon 1106 is displayed on map 1102. The selection of airspace icon 1106, in this example, causes section 1108 to be displayed above map 1102 on graphical user interface 1100. Window 1108 contains notice 1110 corresponding to airspace icon 1106.

Figure 12:
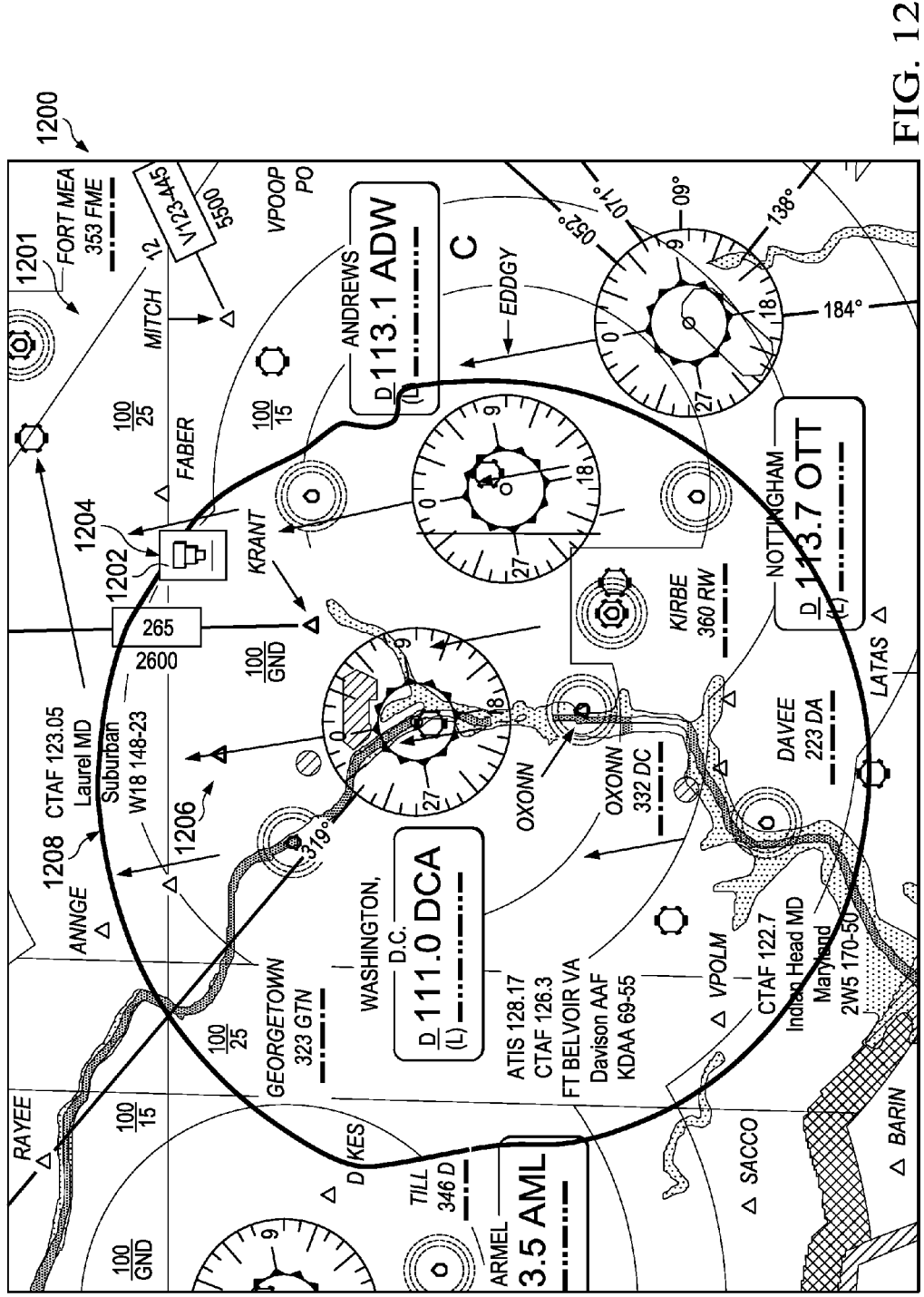
FIG. 12 is an illustration of a graphical user interface in accordance with an advantageous embodiment.

With reference now to FIG. 12, an illustration of a graphical user interface is depicted in accordance with an advantageous embodiment. In this illustrative example, graphical user interface 1200 is yet another example of one implementation for graphical user interface 353 in FIG. 3.

Graphical user interface 1200 includes map 1201. In this example, map 1201 is a portion of a larger map that may be presented to the operator.

As depicted, airspace icon 1202 is displayed at location 1204 on map 1201. Location 1204 is identified on map 1201 by area 1206 within curve 1208. An operator may select airspace icon 1202 on map 1201 on graphical user interface 1200 to read the notice associated with airspace icon 1202.

The illustrations of graphical user interface 800 in FIGS. 8-10, graphical user interface 1100 in FIG. 11, and graphical user interface 1200 in FIG. 12 are only illustrative examples of some implementations for graphical user interface 353 in FIG. 3. These illustrative examples are not meant to limit the manner in which other advantageous embodiments may be implemented. Further, maps 802, 1102, and 1201 are illustrative examples of some implementations for map 351 in FIG. 3. Other types of graphical user interfaces may be used and other types of maps may be displayed.

For example, in some advantageous embodiments, map 1201 may be a moving map. Map 1201 displays an icon for the aircraft to indicate the position of an aircraft on map 1201 corresponding to the actual position of the aircraft. In other advantageous embodiments, graphical user interface 800 may display other maps in addition to map 802.

Figure 13:
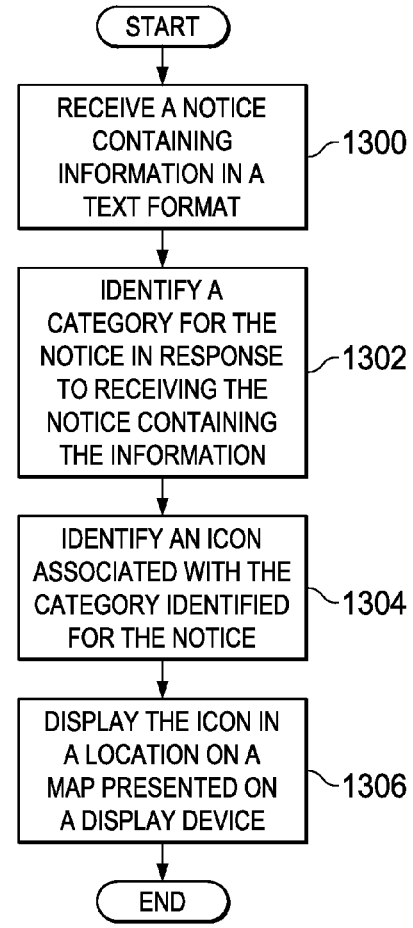
FIG. 13 is an illustration of a flowchart of a process for presenting notices to operate an aircraft in accordance with an advantageous embodiment.

With reference now to FIG. 13, an illustration of a flowchart of a process for presenting notices to operate an aircraft is depicted in accordance with an advantageous embodiment. The process illustrated in FIG. 13 may be implemented in information environment 300 in FIG. 3. Further, the process may be implemented using number of processes 322 in FIG. 3.

The process begins by receiving a notice containing information in a text format (operation 1300). This information identifies events. These events may change the flight of an aircraft. These events include, for example, without limitation, parachute jumps, air shows, kite-flying events, rocket launches, and other types of events. Further, this information identifies other flights for important people, such as heads of state. Still further, the information also identifies closed runways, inoperable radio navigational aids, military exercises, inoperable lights on tall obstructions, a passage of birds through airspace, changes in the concentration of volcanic ash or dust in an airspace, the status of runways, taxiways, and aprons with respect to snow, ice, and standing water, and/or other suitable types of information.

Thereafter, the process identifies a category for the notice in response to receiving the notice containing the information (operation 1302). The category is selected from one of, for example, categories 324 in FIG. 3, categories 400 in FIG. 4, or some other suitable categories. In these examples, the category is identified using the information in the notice. For example, the notice may contain information specifying the category for the notice.

The process then identifies an icon associated with the category identified for the notice (operation 1304). The icon is selected from one of, for example, without limitation, icons 342 in FIG. 3, icons 500 in FIG. 5, icons 600 in FIG. 6, or other suitable icons. In some advantageous embodiments, graphical indicators other than icons may be identified.

Thereafter, the process displays the icon in a location on a map presented on a display device (operation 1306), with the process terminating thereafter. The map may take the form of a chart in some illustrative examples.

Figure 14:
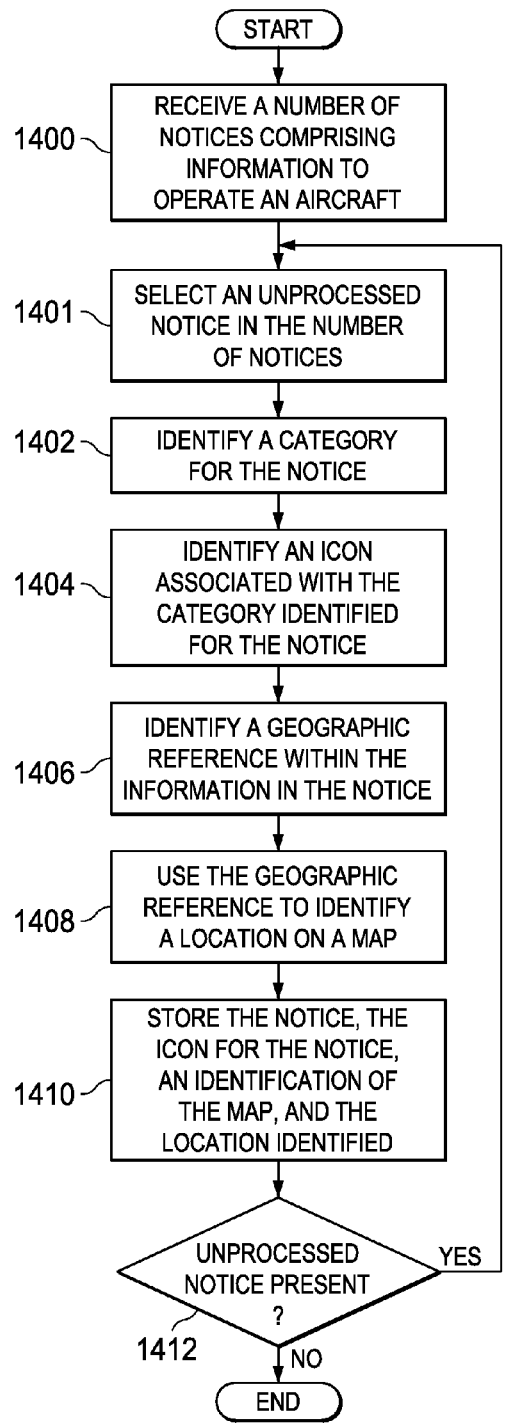
FIG. 14 is an illustration of a flowchart of a process for processing notices for operating an aircraft in accordance with an advantageous embodiment.

With reference now to FIG. 14, an illustration of a flowchart of a process for processing notices for operating an aircraft is depicted in accordance with an advantageous embodiment. The process illustrated in FIG. 14 may be implemented in information environment 300 in FIG. 3.

The process begins by receiving a number of notices containing information to operate an aircraft (operation 1400). The process then selects an unprocessed notice in the number of notices (operation 1401). The process then identifies a category for the notice (operation 1402). The category is selected from a number of categories stored in a database, such as database 350 in FIG. 3. Further, the category is selected from one of navigation, arrival and departure procedures, airport services, airspace, ground movement, and lighting.

The process then identifies an icon associated with the category identified for the notice (operation 1404). The icon is selected from a number of icons stored in the database. The icon is selected from one of icons 500 in FIG. 5 or icons 600 in FIG. 6.

Thereafter, the process identifies a geographic reference within the information in the notice (operation 1406). The process then uses the geographic reference to identify a location on a map based on the geographic reference (operation 1408). The icon for the notice may be displayed on the maps in the location identified.

The process stores the notice, the icon for the notice, an identification of the map, and the location identified (operation 1410). In operation 1410, the notice, the icon, the identification of the map, and the location are stored in a data structure. This data structure may be, for example, without limitation, a file, a list, a database, a spreadsheet, a report, or some other suitable form.

Thereafter, the process determines whether an unprocessed notice is present (operation 1412). If an unprocessed notice is present, the process returns to operation 1401. Otherwise, the process terminates.

Figure 15:
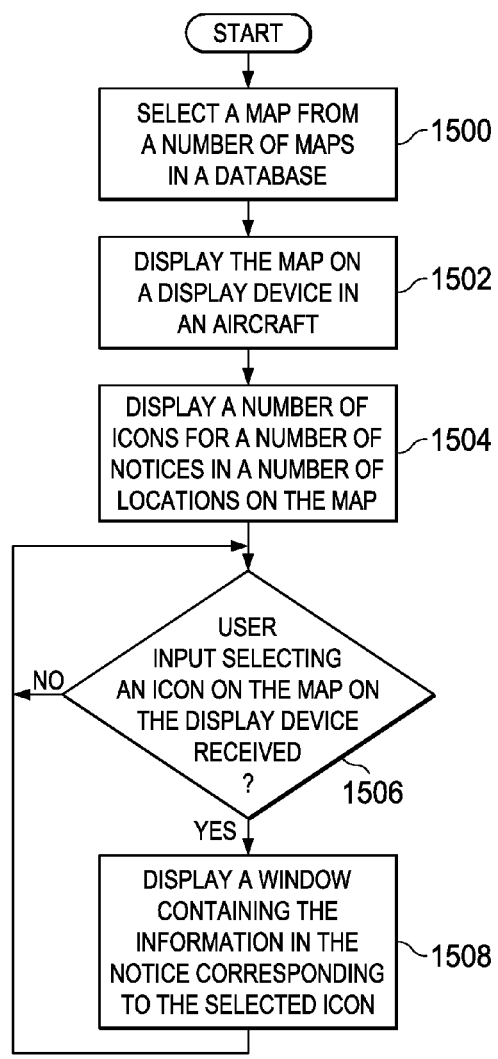
FIG. 15 is an illustration of a flowchart of a process for displaying a map in accordance with an advantageous embodiment.

With reference now to FIG. 15, an illustration of a flowchart of a process for displaying a map is depicted in accordance with an advantageous embodiment. The process illustrated in FIG. 15 may be implemented using computer system 308 in FIG. 3. Further, the process may be implemented using number of processes 322 in FIG. 3.

The process begins by selecting a map from a number of maps in a database (operation 1500). The process displays the map on a display device in an aircraft (operation 1502).

The process then displays a number of icons for a number of notices in a number of locations on the map (operation 1504). In operation 1504, each notice in the number of notices is associated with a location in the number of locations.

Thereafter, the process determines whether user input selecting an icon on the map on the display device has been received (operation 1506). If an icon has not been selected, the process returns to operation 1506 until a selection has been made. Otherwise, if an icon has been selected in the user input, the process displays a window containing the information in the notice corresponding to the selected icon (operation 1508). Thereafter, the process returns to operation 1506 to determine whether another icon has been selected. The operator of the aircraft uses the information in the notice to operate the aircraft.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some advantageous embodiments, operations 1502 and 1504 in FIG. 15 may be performed at the same time. Further, in other advantageous embodiments, the process illustrated in FIG. 15 may include an additional operation. For example, in operation 1506, if the process determines that the user input has not been received, the process may prompt for user input selecting an icon before returning to operation 1506.

Thus, the different advantageous embodiments provide a method and apparatus for presenting notices containing information to operate an aircraft. A notice comprising information in a text format is received. In response to receiving a notice containing information, a category for the notice is identified. An icon associated with the category identified from the notice also is identified. The icon is displayed in a location on the map presented on a display device. The location for displaying the icon on the map is selected using the information in the notice.

The different advantageous embodiments provide a method for viewing all the notices in an area represented by a map. The icons for the notices allow an operator to know what type of information is present in each notice without viewing the information in the notice. These icons allow for easier identification of which notices may be more important or relevant to an operator of the aircraft. This type of system for the presentation of notices to an operator of an aircraft may reduce the time and/or effort spent operating an aircraft.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for presenting a Notice to Airmen, the method comprising:
    storing a category in a database in a computer system, wherein the category is selected from a group of categories stored in the database that comprises at least six categories comprising: navigation, arrival and departure procedures, airport service, airspace, ground movements, and lighting facilities;
    associating an icon with the category, wherein the icon for the category is distinct from a second icon associated with another category;
    receiving the Notice to Airmen comprising information in a text format;
    responsive to receiving the Notice to Airmen, identifying the category, from the group of categories, for the Notice to Airmen, wherein identifying the category is based on the information;
    identifying the icon for the Notice to Airmen associated with the category identified for the Notice to Airmen; and
    displaying the icon for the Notice to Airmen in a location on a map presented on a display device, wherein the location is selected using the information.

2. The method of claim 1 further comprising:
    identifying a geographic reference within the information; and
    selecting the location on the map as one corresponding to a geographic location.

3. The method of claim 2, wherein the geographic reference is used to identify at least one of the location and an area on the map.

4. The method of claim 1 further comprising:
    identifying, using the information in the Notice to Airmen, the map; and
    identifying, using the information in the Notice to Airmen, the location on the map.

5. The method of claim 1 further comprising:
    presenting the information on the display device in response to identifying the icon for the Notice to Airmen.

6. The method of claim 5, wherein the step of presenting the information in response to the selection of the icon for the Notice to Airmen comprises:
    displaying the information in a window on the display device.

7. The method of claim 1, wherein the map is a moving map.

8. The method of claim 1 further comprising:
    operating an aircraft using the icon for the Notice to Airmen presented in the location on the map.

9. The method of claim 1, further comprising:
    storing a subcategory for the category in the database in the computer system;
    associating a subcategory icon with each subcategory stored in the database, wherein the subcategory icon for each subcategory is distinct from the icon for any category or other subcategory;
    responsive to receiving the Notice to Airmen, identifying the subcategory for the Notice to Airmen a group of subcategories stored in the database, wherein identifying the subcategory is based on the information;
    identifying the subcategory icon for the Notice to Airmen associated with the subcategory identified for the Notice to Airmen; and
    displaying the subcategory icon for the Notice to Airmen in a second location on the map presented on the display device, wherein the second location is selected using the information.

10. An apparatus comprising:
    a storage device;
    a program code stored on the storage device; and
    a processor unit configured to:
        run the program code to store a category in the storage device, wherein the category is selected from a group of categories stored in the storage device that comprises at least six categories comprising: navigation, arrival and departure procedures, airport service, airspace, ground movements, and lighting facilities;
        associate an icon with the category, wherein the icon for the category is distinct from a second icon associated with another category;
        receive a Notice to Airmen comprising information in a text format;
        identify, in response to receiving the Notice to Airmen containing the information, the category for the Notice to Airmen, wherein identifying the category is based on the information; and
        identify the icon associated with the category; and display the icon in a location on a map presented on a display device, wherein the location is selected using the information.

11. The apparatus of claim 10, wherein the processor unit is configured to run the program code to identify a geographic reference within the information; and select the location on the map as one corresponding to a geographic location.

12. The apparatus of claim 11, wherein the geographic reference is used to identify at least one of the location and an area on the map.

13. The apparatus of claim 10, wherein the processor unit is configured to run the program code to present the information on the display device in response to identifying the icon.

14. The apparatus of claim 13, wherein in presenting the information in response to the selection of the icon, the processor unit is configured to run the program code to display the information in a window on the display device.

15. The apparatus of claim 10, wherein the map is a moving map.

16. The apparatus of claim 10, wherein the storage device and the processor unit are part of a computer system for an aircraft.

17. The apparatus of claim 16, wherein the computer system comprises one of an electronic flight bag, a navigation computer, and a flight management system.

18. A non-transitory computer recordable storage medium storing a computer program product for presenting notices used to operate an aircraft, the computer program product comprising:
    program code, stored on the non-transitory computer recordable storage medium, configured to store a category in the non-transitory computer recordable storage medium, wherein the category is selected from a group that comprises at least six categories comprising: navigation, arrival and departure procedures, airport service, airspace, ground movements, and lighting facilities;
    program code, stored on the non-transitory computer recordable storage medium, configured to associate an icon with the category, the icon being distinct from a second icon for another category;
    program code, stored on the non-transitory computer recordable storage medium, configured to receive a Notice to Airmen comprising information in a text format;
    program code, stored on the non-transitory computer recordable storage medium, configured to identify the category for the Notice to Airmen in response to receiving the Notice to Airmen containing the information from categories stored in the non-transitory computer recordable storage medium, wherein identifying the category is based on the information;
    program code, stored on the non-transitory computer recordable storage medium, configured to identify the icon associated with the category identified for the Notice to Airmen; and
    program code, stored on the non-transitory computer recordable storage medium, configured to display the icon in a location on a map presented on a display device, wherein the location is selected using the information.

19. The computer program product of claim 18 further comprising:
    program code, stored on the non-transitory computer recordable storage medium, for identifying a geographic reference within the information; and
    program code, stored on the non-transitory computer recordable storage medium, for selecting the location on the map as one corresponding to a geographic location.

20. The computer program product of claim 18 further comprising:
    program code, stored on the non-transitory computer recordable storage medium, for presenting the information in response to identifying the icon.

* * * * *